United States Patent [19]

Ueberschär et al.

[11] Patent Number: 5,316,584
[45] Date of Patent: May 31, 1994

[54] COATING SYSTEM WITH BLADE ADJUSTMENT

[75] Inventors: Manfred Ueberschär, Nattheim; Sergio Giuste, Heidenheim, both of Fed. Rep. of Germany

[73] Assignee: J.M. Voith GmbH, Heidenheim, Fed. Rep. of Germany

[21] Appl. No.: 990,063

[22] Filed: Dec. 14, 1992

[51] Int. Cl.⁵ ............................................. B05C 11/04
[52] U.S. Cl. .................................. 118/712; 118/123; 118/413
[58] Field of Search .................. 118/126, 413, 712; 15/256.5, 256.51; 100/174; 162/281; 427/356; 355/299

[56] References Cited

U.S. PATENT DOCUMENTS

| | | | |
|---|---|---|---|
| 3,783,781 | 1/1974 | Grommek | 15/256.51 |
| 4,919,756 | 4/1990 | Sawdai | 15/256.5 |
| 5,221,351 | 6/1993 | Esser et al. | 118/712 |

Primary Examiner—Michael W. Ball
Assistant Examiner—Richard Crispino
Attorney, Agent, or Firm—Baker & Daniels

[57] ABSTRACT

A coating blade adjustment system with a blade which on its one end is retained in a mounting and supported between this mounting and its working edge by one or several support elements. Between the support edge of the support element(s), in the area within or on the support elements, there is at least one measuring sensor provided for measuring the spacing of the blade from the measuring sensor for a precision adjustment.

6 Claims, 1 Drawing Sheet

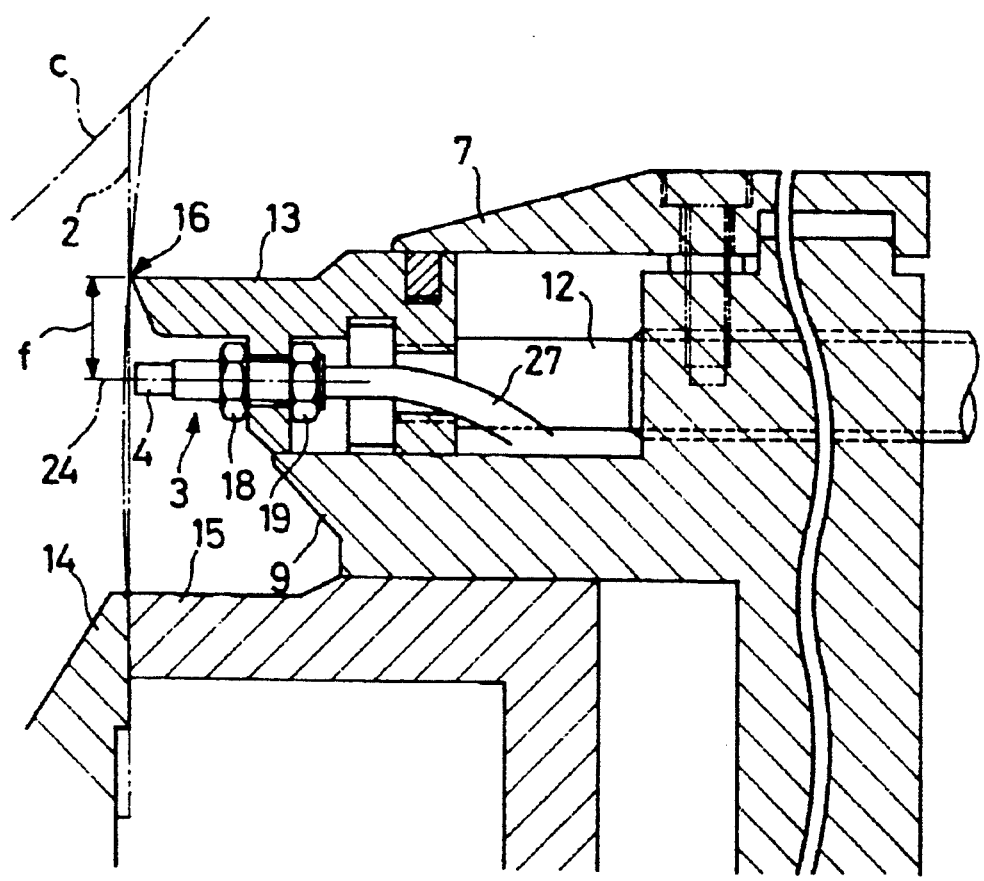

COATING SYSTEM WITH BLADE ADJUSTMENT

BACKGROUND OF THE INVENTION

The invention concerns a coating blade adjustment apparatus or system. Systems of this general type are known, e.g., from U.S. Pat. No. 3,301,214. The coating blade support is effected by support elements, or by a support element which is of a lath type design and, by grooves or incisions, fashioned to be deformable or bendable with relative ease. The local adjustment corresponding to the blade flexure adapted as locally required is effected by pull-thrust screws.

In operation, the blade is subject to very heavy wear which within a time span between about 2 and 6 hours becomes so significant that a blade exchange is necessary. Within this time, of course, the blade tension decreases as a result of the wear, so that an adjustment would be necessary. It is desired to provide an arrangement which enables an automatic, or at least accurately adapted adjustment. The problem underlying the invention is to provide such a system.

SUMMARY OF THE INVENTION

This problem is solved by the features of the present invention. A system is provided which has a blade adjustment. One end of the blade is retained in a mounting and is supported between this mounting and its working edge by one or several support elements. Between the support edge of the support element(s) and the mounting there is provided, in the area within or on the support elements, at least one measuring sensor for measuring the spacing of the blade from the sensor or for capturing the spacing of the blade for a fine tuning of the spacing.

In accordance with another embodiment of the system, the center axis of the measuring sensor is provided at a spacing from the support edge between 0.25 and 0.45 times, preferably between 0.28 and 0.37 times, the spacing between the support edge and the (outermost) edge of the mounting in this spacing range.

In a further embodiment, the invention comprises a process for coating or dosing of continuous paper webs by means of a blade. Measured values of the maximum blade flexure are continuously captured with a sensor operating in noncontact fashion, correlated with a set value of the coating weight, thus forming correction values for the coating weight adjustment.

BRIEF DESCRIPTION OF THE DRAWINGS

The invention will be illustrated hereafter with the aid of the attached drawing, which shows a cross sectional view of the basic coating system.

DETAILED DESCRIPTION OF THE PREFERRED EMBODIMENT

Blade 2 is indicated in the figure only as a dash-dot line, since it has only a thickness often between just 0.3 and 0.7 mm. The blade mounts are referenced 14 and 15 while the backing roll supporting the web to be coated is referenced C, and the support element is referenced 13. The latter may be a continuous lath, or alternatively may consist of several lath sections. An upper guide 7 is provided for the lath. An adjustment can be effected by means of the spindle 12 engaging the lath 13. It is indicated for the heavy coating thickness in a straight position and for a thinner coating thickness in a bowed working position.

The measuring sensor of the type used is sufficiently small and fixed on the support element 13 by means of nuts 18 and 19 and features a lead. The guidance by the support element 13 is complemented by a lower guide part 9 situated opposite the upper guide 7.

A measuring sensor 3 with an essentially cylindrical measuring head 4 is now located with its center axis at a certain, favorable spacing from the support edge 16 of the support element 13. The tension of the blade is generally generated by the position of the coating system relative to the paper web or to the roll carrying it and decreases as the blade wears, because the flexure of the blade decreases due to the blade shortening that occurs through the wear. This decreasing flexure expresses itself in a diminishing spacing between the blade and measuring sensor 3.

The lead, or cable with the leads and any return lines, is referenced 27.

The distance f between the support line 16 and the center axis 24 of the measuring sensor 3 ranges favorably between 0.25 and 0.45 times, preferably between 0.28 and 0.37 times the distance between the support edge 16 and the edge of the mounting 14, 15 in this spacing range where the blade protrudes from the mounting. Obtained thereby is an arrangement possessing a measuring accuracy sufficient to capture the wear of the coating blade during the operation and initiate appropriate measures for its adjustment, for instance via a carrier element such as the guide part 9. Associated with it is mostly also an angular adjustment of the blade by pivoting the blade support beam. Adjustment options of most varied type, naturally, are freely selectable with this arrangement.

Operating on eddy current basis, the spacing measuring sensor 3 is a product, e.g., by the firm Mikro-Epsilon MeBtechnik GmbH & Co. KG, W-8359 Ostenburg-Dorfbach, type U1, unshielded sensor of the multi-NCDT sensors.

Advantages of this system are:
1. reactionless measurement;
2. lack of wear and tear;
3. no friction, no hysteresis;
4. no problems by contamination or in cleaning, since the arrangement is on the "dry" blade side; and
5. the installation position is always optimally in the maximum of the flexure, irrespective of the free blade length of the sensor used and of the installation position.

It may likewise be possible—and at that, with coating blades of relatively large thickness—to use a so-called air nozzle measuring setup. Measured here is the pressure in a nozzle which adjusts on account of an air jet issuing opposite a wall arranged opposite the nozzle opening.

What is claimed is:

1. A coating blade adjustment apparatus comprising:
   a blade having a working edge at one end thereof;
   a mounting for said blade, said mounting being structured and arranged to retain said blade at the other end of the blade from said working edge;
   a support element for the blade, said support element having a support edge and being positioned between said blade working edge and said mounting; and
   a measuring sensor between the support edge of the support element and said mounting in the area within or on the support element for measuring the spacing of the blade from the sensor, whereby said spacing can be controlled by an adjustment means.

2. The coating blade adjustment apparatus of claim 1, wherein the measuring sensor has a center axis and the mounting has an edge, and wherein said blade is retained in said mounting at said edge and protrudes therefrom, said center axis being provided at a spacing from the support edge between 0.25 and 0.45 times the spacing between the support edge and said mounting edge.

3. The coating blade adjustment apparatus of claim 2, wherein said spacing is between 0.28 and 0.37 times the spacing between the support edge and said mounting edge.

4. The coating blade adjustment apparatus of claim 1, wherein the measuring sensor is a noncontact eddy current path measuring system.

5. The coating blade adjustment apparatus of claim 1, wherein adjustment means for adjustment of the blade can be actuated independently of a measured signal from the measuring sensor.

6. Coating blade adjustment apparatus with a blade which on its one end is retained in a mounting and is supported between this mounting and its working edge by at least one support element, characterized in that between the support edge of the at least one support element and the mounting there is provided, in the area within or on the at least one support element, at least one measuring sensor for measuring the spacing of the blade from the sensor for a fine tuning of the spacing.

* * * * *